Feb. 26, 1924.
A. G. FRANCE
1,484,769
LOCKING WASHER FOR NUTS AND THE LIKE
Filed July 20, 1922
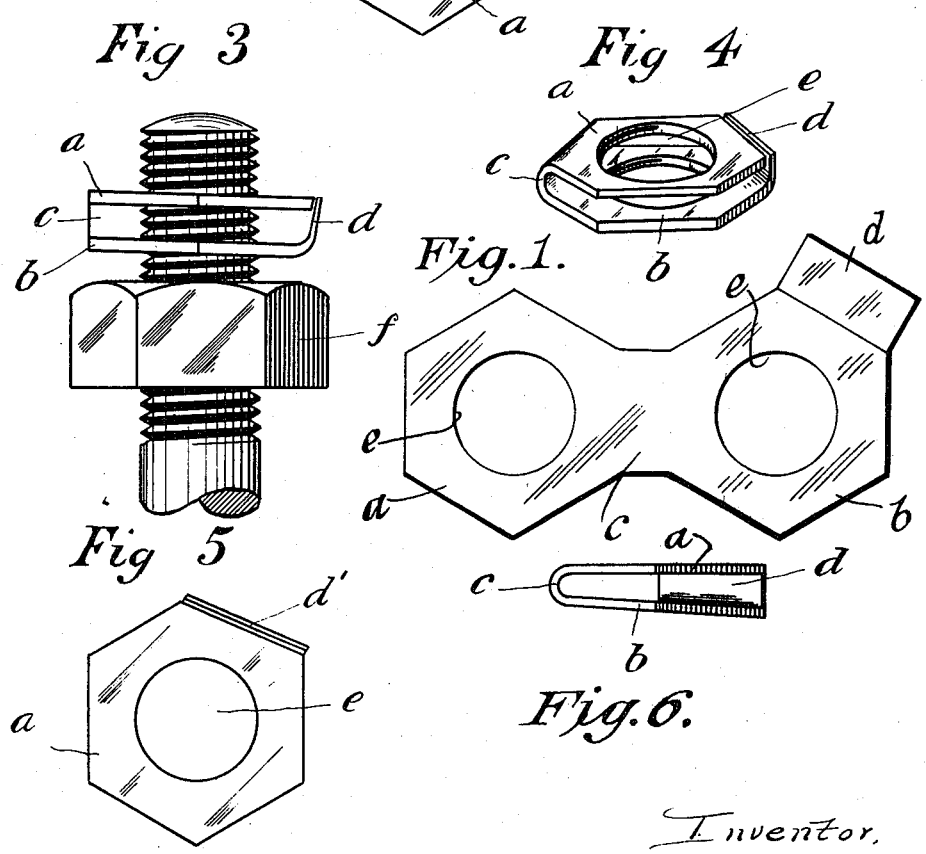
Inventor,
Arthur Graham France
By Glenn S. Noble
Atty.

Patented Feb. 26, 1924.

1,484,769

UNITED STATES PATENT OFFICE.

ARTHUR GRAHAM FRANCE, OF LONDON, ENGLAND.

LOCKING WASHER FOR NUTS AND THE LIKE.

Application filed July 20, 1922. Serial No. 576,314.

*To all whom it may concern:*

Be it known that I, ARTHUR GRAHAM FRANCE, subject of the King of Great Britain, of 64 Chancery Lane, London, W. C. 2, England, have invented certain new and useful Improvements in Locking Washers for Nuts and the like, of which the following is a specification.

This invention relates to a new or improved locking washer for nuts and the like, and has for its object to provide a locking washer which is simple and cheap to manufacture while being extremely efficient in use.

With this object in view my invention essentially comprises a locking washer formed of two flat hexagonal or angular members connected at one edge and separated from each other, the washer being preferably formed from a sheet metal blank which is folded over, the junction of the two portions forming one side of the hexagonal or other angular form of the washer. A thread is tapped through both portions at a slight inclination from the perpendicular to the flat face, so that as the washer is screwed down upon a bolt and abuts upon the upper face of a nut or the like, the two portions of the washer approach each other and the consequent distortion sets up a wedging action which causes the washer to grip the bolt.

To increase the wedging and gripping action there is preferably provided on one edge of one portion of the washer an extended tongue which is bent upwards at a slight angle to the vertical, and is adapted to be engaged by one edge of the other portion in such a manner that, as the washer is screwed down onto a nut or other surface and the two portions approach each other, a lateral thrust in opposite directions is set up by the engagement of the inclined tongue with the edge of the other portion, ensuring a most effective grip of the bolt or the like.

As an additional security one of the angular edges of one portion of the washer may be arranged out of true and adapted to be engaged by an upturned tongue on the other portion so that any tendency to relative rotation of the two portions causes a relative lateral displacement of the two portions and hence a further wedging action on the bolt.

Further, the two portions of the washer may not in some cases be parallel, but may be arranged at a slight angle to each other to intensify the lateral displacement and wedging action upon the bolt caused by the approach of the two portions to each other.

In use the locking washer is screwed down on the bolt behind the nut which it is desired to lock, and a most effective locking of the nut is thus obtained.

It is also possible by forming the two portions of the washer of substantial thickness to employ the washer as an effective self-locking nut, and the ordinary nut and locking device may be dispensed with.

In order that the manner of carrying my invention into practice may be clearly understood, I have illustrated two embodiments thereof in the accompanying drawings in which—

Figure 1, is a plan of the blank from which the washer is stamped or pressed up.

Figure 2, is a plan of the completed washer.

Figure 3, is a side elevation of the washer upon a bolt.

Figure 4, is a perspective view of the washer.

Figure 5, is a plan of a modified construction in which the upturned tongue and the edge of the other portion by which it is engaged are arranged out of true to give an additional wedging action.

Figure 6, is a side elevation of a further modified form in which the two portions of the washer are arranged at a slight angle to each other.

In the drawings the two portions of the washer are shown at *a* and *b*, and are connected by the integral web portion *c*, the washer being pressed up from a sheet metal blank of suitable thickness and of the form shown in plan in Fig. 1. An extended tongue *d* is provided on one edge of the portion *b* of the washer, and is cranked upwards at a slight angle to the vertical as shown in Figs. 3 and 4, the inner side of its upper edge being normally just in contact with the corresponding edge of the portion *a*. The tongue *d* may be conveniently tapered or chamfered off towards its upper edge as shown in Figs. 3 and 4.

The portions *a* and *b* are normally parallel, but the aperture *e* which is drilled and threaded through both portions to receive the bolt, or the like, is drilled at a slight inclination from the perpendicular to the flat faces of the washer so that when the washer is screwed upon a bolt, the washer is not at right angles to the axis of the bolt, but is slightly inclined as shown in Fig. 3. As the washer is screwed down upon a nut f the edge of the lower portion b of the washer carrying the tongue d first makes contact with the upper face of the nut, and a double wedging action is set up by the consequent thrust tending to cause the two portions of the washer to approach each other, firstly, the wedging action caused by the distortion of the washer as the two portions are forced out of parallelism, and secondly, the wedging action due to the mutual lateral thrust between the tongue d and the edge of the portion a against which it is forced.

In the modified construction shown in Fig. 5 the wedging action is further enhanced by forming the tongue d', and the edge of the other portion by which it is engaged slightly out of true, i. e., not at right angles to a radius drawn to the middle point of the upturned tongue d'. There is thus an additional wedging action set up, since the friction of the lower portion of the washer b tends to cause relative rotation of the two portions of the washer, and the tongue d' and its engaging edge form an inclined plane or cam by which the two portions are laterally displaced with respect to each other.

In this modification the tongue d' is shown as serving both this function and the function carried out by the tongue d in Figs. 1 to 4, but, if desired, separate tongues may be provided for the two purposes, or either form of tongue may be employed alone.

In the modification illustrated in Fig. 6 the washer is formed exactly as described with reference to Figs. 1 and 2, but the two portions a and b are inclined at a small angle to each other, being spaced more widely apart at the free edges than at the connected edge. The axis of the threaded apertures in this case may be at right angles to the flat surface of the upper portion a, and is therefore at a small inclination from the vertical to the flat face of the member b.

It will be seen from the above description that as my improved locking washer is screwed down upon a bolt and into contact with a nut, a positive lock or gripping action upon the thread of the bolt is obtained.

As the two portions a and b of the washer are forced together the threads are gripped at the top and at the bottom, while as the tongue d comes into operation and the portions a and b are displaced laterally, the sides of the threads are gripped at diametricaly opposed points. Further, as the horizontal wedge or cam surface d' comes into operation owing to the tendency of the two portions a and b to be rotated relative to each other, the sides of the threads are further gripped at diametrically opposed points in a direction at a substantial angle to the gripping action caused by the tongue d. The actual gripping action is the resultant of these various agencies in the washer.

I claim:

1. In a locking washer the combination of two flat angular members spaced apart and connected along one edge, and coaxial screw-threaded apertures in the said members to receive a bolt, the axis of the apertures being at a small inclination from the vertical to the flat face of one angular member and the members being inclined from the same side of a perpendicular to the axis of the bolt to which the washer is applied.

2. In a locking washer the combination of two flat angular members spaced apart and connected along one edge, and coaxial screw-threaded apertures in the said members to receive a bolt, the axis of the apertures being at a small inclination from the vertical to the flat face of one angular member, and the said angular members being inclined at a small angle to each other and in the same direction from a plane at right angles to the axis of a bolt to which the washer is applied.

3. In a locking washer the combination of two flat angular members spaced apart and connected along one edge, coaxial screw-threaded apertures in the said members to receive a bolt, the axis of the apertures being at a small inclination from the vertical to the flat face of one angular member, and an inclined tongue on one edge of one of the said members directed towards and adapted to be engaged by the corresponding edge of the other said member.

4. In a locking washer the combination of two flat angular members spaced apart and connected along one edge, coaxial screw-threaded apertures in the said members to receive a bolt, the axis of the apertures being at a small inclination from the vertical to the flat face of one angular member, and a bent tongue on one edge of one of the said members directed towards and adapted to be engaged by one edge of the other said member, the tongue and its engaging edge being inclined at a small angle to a tangent drawn to a radius of the first said member at the middle point of the tongue.

5. In a locking washer, two flat members spaced apart and connected along one edge having coaxial threaded apertures to receive a bolt and an inclined tongue on one edge of one of the members directed toward and adapted to be engaged by the corresponding edge of the other member when the members are spaced together.

In testimony whereof I affix my signature.

ARTHUR GRAHAM FRANCE.